United States Patent
Singh et al.

(10) Patent No.: US 11,257,265 B2
(45) Date of Patent: Feb. 22, 2022

(54) SYSTEMS AND METHODS FOR PEST PRESSURE HEAT MAPS

(71) Applicant: FMC Corporation, Philadelphia, PA (US)

(72) Inventors: Sukhvinder Singh, Johnston, IA (US); Sara Catherine Sterling, Thorndale, PA (US); Simon Bridge Barratt, Ardmore, PA (US); Paul D'Hyver De Las Deses, Chicago, IL (US); Wandi Lin, Chicago, IL (US); Ross Joseph Putterman, Chicago, IL (US); Ian Anthony Stuart-Hoff, Chicago, IL (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 17/081,263

(22) Filed: Oct. 27, 2020

(65) Prior Publication Data

US 2021/0279923 A1  Sep. 9, 2021

Related U.S. Application Data

(60) Provisional application No. 62/984,881, filed on Mar. 4, 2020.

(51) Int. Cl.
*G06T 11/20* (2006.01)
*G06N 20/00* (2019.01)
(Continued)

(52) U.S. Cl.
CPC ........... *G06T 11/206* (2013.01); *A01M 1/026* (2013.01); *G06F 3/04842* (2013.01);
(Continued)

(58) Field of Classification Search
CPC ................. G06T 11/206; G06T 11/001; G06T 2207/10032; G06T 2200/24;
(Continued)

(56) References Cited

U.S. PATENT DOCUMENTS

| 9,563,852 B1 | 2/2017 | Wiles et al. |
| 10,171,564 B2 | 1/2019 | Wilbur et al. |

(Continued)

FOREIGN PATENT DOCUMENTS

| EP | 3482630 | 5/2019 |
| WO | 2004/110142 | 12/2004 |
| WO | 2012/054397 | 4/2012 |

*Primary Examiner* — Todd Buttram

(57) ABSTRACT

Systems and methods for generating and displaying heat maps are provided. A heat map generation computing device includes a memory and a processor. The processor is programmed to receive trap data for a plurality of pest traps in a geographic location, the trap data including current and historical pest pressure values at each of the plurality of pest traps, receive weather data for the geographic location, receive image data for the geographic location, apply a machine learning algorithm to generate predicted future pest pressure values at each of the plurality of pest traps, generate a first heat map for a first point in time and a second heat map for a second point in time, and transmit the first and second heat maps to a mobile computing device to cause a user interface on the mobile computing device to display a time lapse heat map.

20 Claims, 10 Drawing Sheets

(51) Int. Cl.
   *G06T 11/00* (2006.01)
   *G06F 3/0484* (2013.01)
   *G06T 7/00* (2017.01)
   *A01M 1/02* (2006.01)
   *G06F 3/04842* (2022.01)

(52) U.S. Cl.
   CPC ........... *G06N 20/00* (2019.01); *G06T 7/0002* (2013.01); *G06T 11/001* (2013.01); *G06T 11/203* (2013.01); *G06T 2200/24* (2013.01); *G06T 2207/10032* (2013.01); *G06T 2207/20081* (2013.01); *G06T 2207/30188* (2013.01)

(58) Field of Classification Search
   CPC ........... G06T 2207/20081; G06T 2207/30188; G06N 20/00; G06F 3/04842; A01M 1/026
   See application file for complete search history.

(56) References Cited

U.S. PATENT DOCUMENTS

| | | | |
|---|---|---|---|
| 2008/0312942 A1 | 12/2008 | Katta et al. | |
| 2015/0025926 A1 | 1/2015 | Green et al. | |
| 2016/0308954 A1* | 10/2016 | Wilbur | H04L 67/18 |
| 2017/0041407 A1* | 2/2017 | Wilbur | H04W 4/60 |
| 2019/0327951 A1* | 10/2019 | Selvig | G05B 15/02 |
| 2020/0184153 A1* | 6/2020 | Bongartz | G06N 5/04 |
| 2021/0279639 A1* | 9/2021 | Singh | G01W 1/10 |
| 2021/0279923 A1* | 9/2021 | Singh | G06T 11/001 |

* cited by examiner

SYSTEMS AND METHODS FOR PEST PRESSURE HEAT MAPS

CROSS REFERENCE TO RELATED APPLICATIONS

This application claims priority to provisional application Ser. No. 62/984,881, filed Mar. 4, 2020, which is incorporated herein by reference in its entirety.

BACKGROUND

The present application relates generally to a technology that may be used to assist in monitoring pest pressure, and more particularly, to network-based systems and methods for generating and display pest pressure heat maps.

Due to the world's increasing population and decreasing amount of arable land, there is a desire for methods and systems to increase the productivity of agricultural crops. At least one factor that impacts the productivity of agricultural crops is pest pressure.

Accordingly, systems and methods have been developed to monitor and analyze pest pressure. For example, in at least some known systems, a plurality of insect traps are placed in a field of interest. To monitor the pest pressure in the field of interest, the traps are inspected regularly to count the number of pests in each trap. Based on the number of pests in each trap, a pest pressure level for the field of interest can be determined.

The number of pests monitored in each trap may also be used to predict future pest pressures. However, pest pressure is a relatively complex phenomenon that is governed by several factors. Thus, accurately predicting future pest pressures based primarily on trap counts may be relatively inaccurate. Further, at least some known systems for pest pressure monitoring are focused at an individual farm level, resulting in limited visualizations and significant time lag in data collections. In addition, at least some known systems for predicting future pest pressure rely on static logic (e.g., fixed phenology models and/or decision trees), and are accordingly limited in their ability to accurately predict future pest pressure.

Accordingly, it would be desirable to provide a system that captures and intelligently analyzes a plurality of different types of information to quickly and accurately predict future pest pressures. Further, it would be desirable to present predicted future pest pressures to assist users in performing the technical task of monitoring pest pressure, and optionally controlling a pest trap system and/or a pest treatment system.

BRIEF DESCRIPTION

In one aspect, a heat map generation computing device is provided. The heat map generation computing device includes a memory and a processor communicatively coupled to the memory. The processor is programmed to receive trap data for a plurality of pest traps in a geographic location, the trap data including current and historical pest pressure values at each of the plurality of pest traps, receive weather data for the geographic location, receive image data for the geographic location, and apply a machine learning algorithm to the trap data, the weather data, and the image data to generate predicted future pest pressure values at each of the plurality of pest traps. The processor is further programmed to generate a first heat map for a first point in time and a second heat map for a second point in time, the second heat map generated using the predicted future pest pressure values, the first and second heat maps each generated by plotting a plurality of nodes on a map of the geographic location, each node corresponding to one of the plurality of pest traps, each node having a color that represents the pest pressure value for the corresponding pest trap at the associated point in time, and coloring at least some remaining portions of the map of the geographic location to generate a continuous map of pest pressure values for the geographic location by interpolating between pest pressure values associated with the plurality of nodes at the associated point in time. The processor is further programmed to transmit the first and second heat maps to a mobile computing device to cause a user interface on the mobile computing device to display a time lapse heat map that dynamically transitions between the first heat map and the second heat map over time, the user interface implemented via an application installed on the mobile computing device.

In another aspect, method for generating heat maps is provided. The method is implemented using a heat map generation computing device including a memory communicatively coupled to a processor. The method includes receiving trap data for a plurality of pest traps in a geographic location, the trap data including current and historical pest pressure values at each of the plurality of pest traps, receiving weather data for the geographic location, receiving image data for the geographic location, and applying a machine learning algorithm to the trap data, the weather data, and the image data to generate predicted future pest pressure values at each of the plurality of pest traps. The method further includes generating a first heat map for a first point in time and a second heat map for a second point in time, the second heat map generated using the predicted future pest pressure values, the first and second heat maps each generated by plotting a plurality of nodes on a map of the geographic location, each node corresponding to one of the plurality of pest traps, each node having a color that represents the pest pressure value for the corresponding pest trap at the associated point in time, and coloring at least some remaining portions of the map of the geographic location to generate a continuous map of pest pressure values for the geographic location by interpolating between pest pressure values associated with the plurality of nodes at the associated point in time. The method further includes transmitting the first and second heat maps to a mobile computing device to cause a user interface on the mobile computing device to display a time lapse heat map that dynamically transitions between the first heat map and the second heat map over time, the user interface implemented via an application installed on the mobile computing device.

In yet another aspect, a computer-readable storage medium having computer-executable instructions embodied thereon is provided. When executed by a heat map generation computing device including at least one processor in communication with a memory, the computer-readable instructions cause the heat map generation computing device to receive trap data for a plurality of pest traps in a geographic location, the trap data including current and historical pest pressure values at each of the plurality of pest traps, receive weather data for the geographic location, receive image data for the geographic location, and apply a machine learning algorithm to the trap data, the weather data, and the image data to generate predicted future pest pressure values at each of the plurality of pest traps. The instructions further cause the heat map generation computing device to generate a first heat map for a first point in time and a second heat map for a second point in time, the second heat map generated using the predicted future pest pressure values, the first and second heat maps each generated by plotting a plurality of nodes on a map of the geographic location, each node corresponding to one of the plurality of pest traps, each node having a color that represents the pest pressure value for the corresponding pest trap at the associated point in time, and coloring at least some remaining portions of the map of the geographic location to generate a continuous map of pest pressure values for the geographic location by interpolating between pest pressure values associated with the plurality of nodes at the associated point in time. The instructions further cause the heat map generation computing device to transmit the first and second heat maps to a mobile computing device to cause a user interface on the mobile computing device to display a time lapse heat map that dynamically transitions between the first heat map and the second heat map over time, the user interface implemented via an application installed on the mobile computing device.

BRIEF DESCRIPTION OF THE DRAWINGS

FIG. 1 is a block diagram of a computer system used in predicting pest pressures in accordance with one embodiment of the present disclosure.

FIG. 2 is a block diagram illustrating data flow through the system shown in FIG. 1.

FIG. 3 illustrates an example configuration of a server system such as the pest pressure prediction computing device of FIGS. 1 and 2.

FIG. 4 illustrates an example configuration of a client system shown in FIGS. 1 and 2.

FIG. 5 is a flow diagram of an example method for generating pest pressure data using the system shown in FIG. 1.

FIG. 6 is a flow diagram of an example method for generating heat maps using the system shown in FIG. 1.

FIGS. 7-10 are screenshots of a user interface that may be generated using the system shown in FIG. 1

Figure 1:
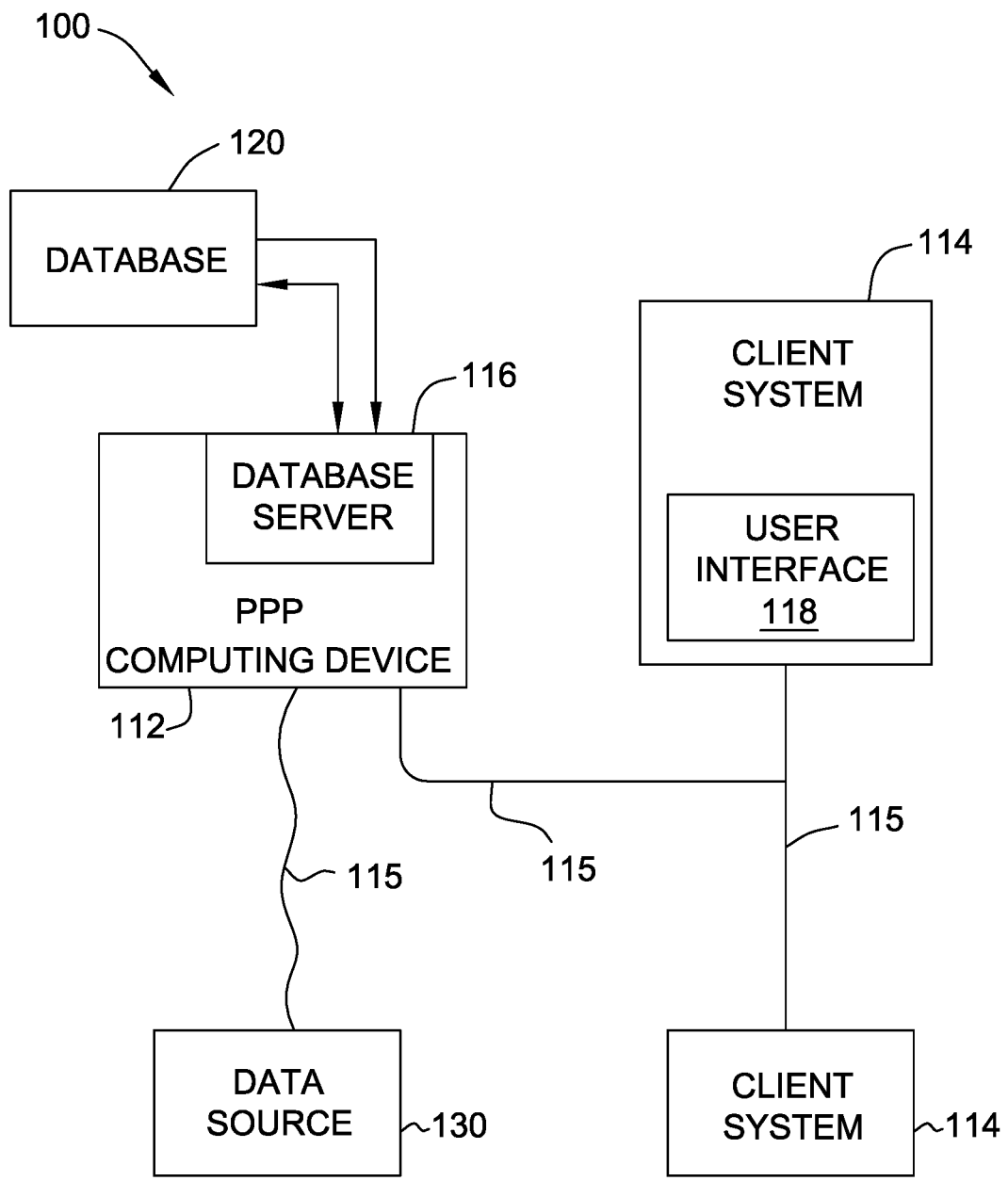
FIGS. 1-10 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to computer-implemented systems for generating and displaying pest pressure heat maps. A heat map generation computing device receives trap data for a plurality of pest traps in a geographic location, receives weather data for the geographic location, receives image data for the geographic location, and applies a machine learning algorithm to the trap data, the weather data, and the image data to generate predicted future pest pressure values at each of the plurality of pest traps. The heat map generation computing device generates a first heat map for a first point in time and a second heat map for a second point in time, the second heat map generated using the predicted future pest pressure values, the first and second heat maps each generated by plotting a plurality of nodes on a map of the geographic location, each node corresponding to one of the plurality of pest traps, each node having a color that represents the pest pressure value for the corresponding pest trap at the associated point in time, and coloring at least some remaining portions of the map of the geographic location to generate a continuous map of pest pressure values for the geographic location by interpolating between pest pressure values associated with the plurality of nodes at the associated point in time. The heat map generation computing device transmits the first and second heat maps to a mobile computing device to cause a user interface on the mobile computing device to display a time lapse heat map that dynamically transitions between the first heat map and the second heat map over time, the user interface implemented via an application installed on the mobile computing device.

The systems and methods described herein facilitate accurately predicting pest pressure at one or more geographic locations. As used herein, a 'geographic location' generally refers to an agriculturally relevant geographic location (e.g., a location including one or more fields and/or farms for producing crops). Further, as used here, 'pest pressure' refers to a qualitative and/or quantitative assessment of the abundance of pests present at a particular location. For example, a high pest pressure indicates that a relatively large abundance (e.g., as compared to an expected abundance) of pests are present at the location. In contrast, a low pest pressure indicates that a relatively low abundance of pests are present at the location. In at least some of the embodiments described herein, pest pressure is analyzed for agricultural purposes. That is, pest pressure is monitored and predicted for one or more fields. However, those of skill in the art will appreciate that the systems and methods described herein may be used to analyze pest pressure in any suitable environment.

As used herein, the term 'pest' refers to an organism whose presence is generally undesirable at the particular geographic location, in particular an agriculturally relevant geographic location. For example, for implementations that analyze pest pressure for one or more fields, pests may include insects that have a propensity to damage crops in those fields. However, those of skill in the art will appreciate that the systems and methods described herein may be used to analyze pest pressure for other types of pests. For example, in some embodiments, pest pressure may be analyzed for fungi, weeds, and/or diseases. The systems and methods described herein refer to 'pest traps' and 'trap data'. As used herein, 'pest traps' may refer to any device capable of containing and/or monitoring presence of a pest of interest, and 'trap data' may refer to data gathered using such a device. For example, for insects, the 'pest trap' may be a conventional containment device that secures the pest. Alternatively, for fungi, weeds, or diseases, the 'pest trap' may refer to any device capable of monitoring presence and/or levels of the fungi, weeds, and/or diseases. For example, in embodiments where the 'pest' is one or more species of fungi, the 'pest trap' may refer to a sensing device capable of quantitatively measuring a level of spores associated with the one or more species of fungi in the ambient environment around the sensing device. In one embodiment, the 'pest' is a type of insect or multiple types of insects, and the terms 'pest trap' and 'pest traps' refer to 'insect trap' and 'insect traps', respectively.

The following detailed description of the embodiments of the disclosure refers to the accompanying drawings. The same reference numbers in different drawings may identify the same or similar elements. Also, the following detailed description does not limit the claims.

Described herein are computer systems such as pest pressure prediction computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to predicting pest pressure.

FIG. 1 is a block diagram of an example embodiment of a computer system 100 used in predicting pest pressures that includes a pest pressure prediction (PPP) computing device 112 in accordance with one example embodiment of the present disclosure. PPP computing device 112 may also be referred to herein as a heat map generation computing device, as described herein. In the example embodiment, system 100 is used for predicting pest pressures and generating pest pressure heat maps, as described herein.

More specifically, in the example embodiment, system 100 includes pest pressure prediction (PPP) computing device 112, and a plurality of client sub-systems, also referred to as client systems 114, connected to PPP computing device 112. In one embodiment, client systems 114 are computers including a web browser, such that PPP computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with farmers, growers, scouts, etc. as well as external systems used to store data. PPP computing device 112 is also in communication with one or more data sources 130 using network 115. Further, client systems 114 may additionally communicate with data sources 130 using network 115. Further, in some embodiments, one or more client systems 114 may serve as data sources 130, as described herein. Client systems 114 may be any device capable of interconnecting to the Internet including a web-based phone, PDA, or other web-based connectable equipment.

A database server 116 is connected to a database 120, which contains information on a variety of matters, as described below in greater detail. In one embodiment, centralized database 120 is stored on PPP device 112 and can be accessed by potential users at one of client systems 114 by logging onto PPP computing device 112 through one of client systems 114. In an alternative embodiment, database 120 is stored remotely from PPP device 112 and may be non-centralized. Database 120 may be a database configured to store information used by PPP computing device 112 including, for example, transaction records, as described herein.

Database 120 may include a single database having separated sections or partitions, or may include multiple databases, each being separate from each other. Database 120 may store data received from data sources 130 and generated by PPP computing device 112. For example, database 120 may store weather data, imaging data, trap data, scouting data, grower data, pest pressure prediction data, and/or heat map data, as described in detail herein.

In the example embodiment, client systems 114 may be associated with, for example, a grower, a scouting entity, a pest management entity, and/or any other party capable of using system 100 as described herein. In the example embodiment, at least one of client systems 114 includes a user interface 118. For example, user interface 118 may include a graphical user interface with interactive functionality, such that pest pressure predictions and/or heat maps, transmitted from PPP computing device 112 to client system 114, may be shown in a graphical format. A user of client system 114 may interact with user interface 118 to view, explore, and otherwise interact with the displayed information.

In the example embodiment, PPP computing device 112 receives data from a plurality of data sources 130, and aggregates and analyzes the received data (e.g., using machine learning) to generate pest pressure predictions and/or heat maps, as described in detail herein.

Figure 2:
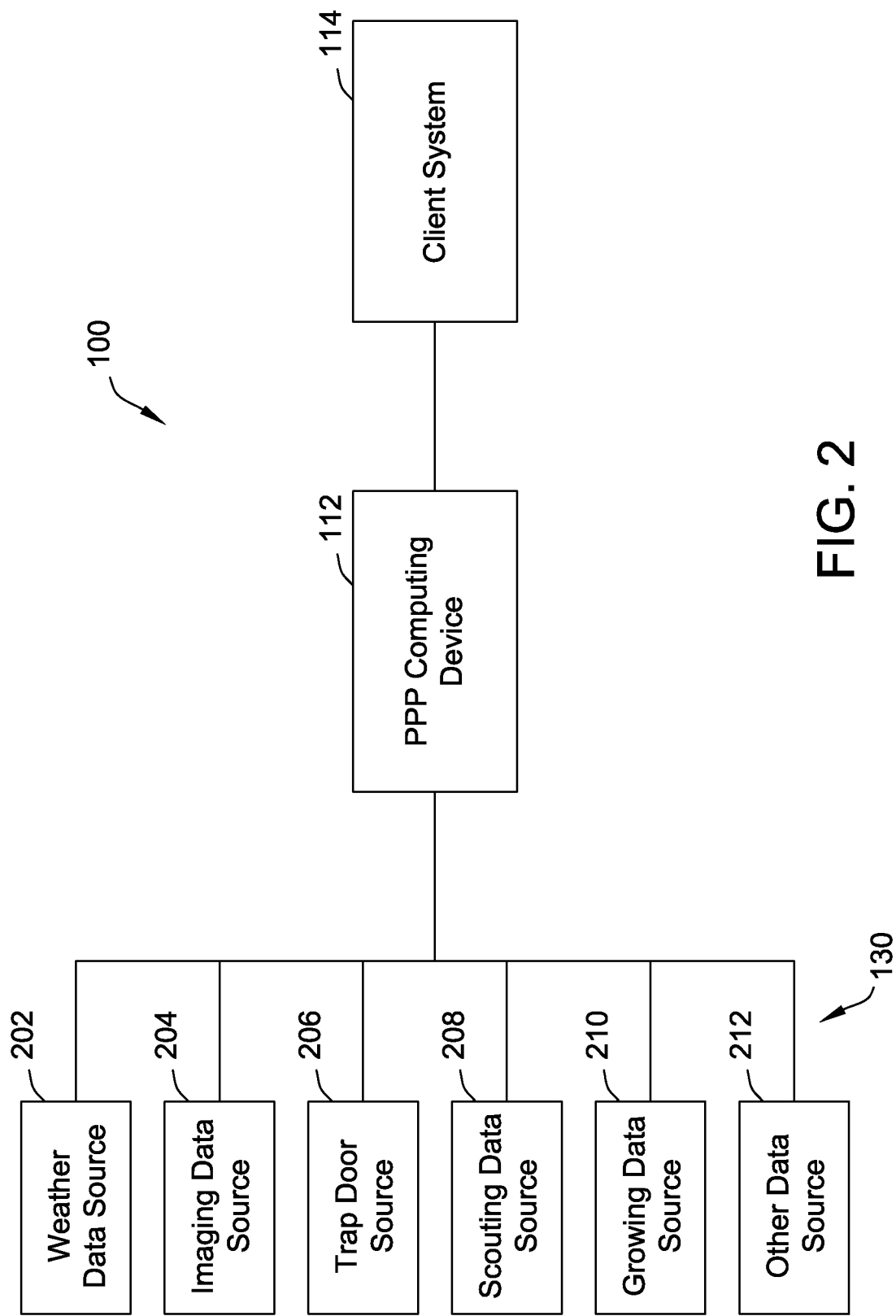

FIG. 2 is a block diagram illustrating data flow through system 100. In the embodiment shown in FIG. 2, data sources 130 include a weather data source 202, an imaging data source 204, a trap data source 206, a scouting data source, a grower data source 210, and an another data source 212. Those of skill in the art will appreciate that data sources 130 shown in FIG. 2 are merely examples, and that system 100 may include any suitable number and type of data source.

Weather data source 202 provides weather data to PPP computing device 112 for use in generating pest pressure predictions. Weather data may include, for example, temperature data (e.g., indicating current and/or past temperatures measured at one or more geographic locations), humidity data (e.g., indicating current and/or past humidity at measured at one or more geographic locations), wind data (e.g., indicating current and/or past wind levels and direction measured at one or more geographic locations), rainfall data (e.g., indicating current and/or past rainfall levels measured at one or more geographic locations), and forecast data (e.g., indicating future weather conditions predicted for one or more geographic locations).

Imaging data source 204 provides image data to PPP computing device 112 for use in generating pest pressure predictions. Image data may include, for example, satellite images and/or drone images acquired of one or more geographic locations.

Trap data source 206 provides trap data to PPP computing device 112 for use in generating pest pressure predictions. Trap data may include, for example, pest counts (e.g., expressed as number of a pest species, density of the pest species, or the like) from at least one pest trap in a geographic location. Further, trap data may include, for example, in the case of insects, pest type (e.g., taxonomic genus, species, variety, etc.) and/or pest developmental stage and gender (e.g., larva, juvenile, adult, male, female, etc.). The pest traps may be, for example, insect traps. Alternatively, the pest traps may be any device capable of determining a pest presence and providing trap data to PPP computing device 112 as described herein. For example, in some embodiments, the pest traps are sensing devices operable to sense an ambient level of spores associated with one or more species of fungi. In such embodiments, the trap data may include, for example, number of spores (representing the pest count), fungus type, fungus developmental stage, etc.

In some embodiments, trap data source 206 is a pest trap that is communicatively coupled to PPP computing device 112 (e.g., over a wireless communication link). Accordingly, in such embodiments, trap data source 206 may be capable of automatically determining a pest count in the pest trap (e.g., using image processing algorithms) and transmitting the determined pest count to PPP computing device.

Scouting data source 208 provides scouting data to PPP computing device 112 for use in generating pest pressure predictions. Scouting data may include any data provided by a human scout that monitors one or more geographic locations. For example, the scouting data may include crop condition, pest counts (e.g., manually counted at a pest trap by the human scout), etc. In some embodiments, scouting data source 208 is one of client systems 114. That is, a scout can both provide scouting data to PPP computing device 112 and view pest pressure prediction data and/or heat map data using the same computing device (e.g., a mobile computing device).

Grower data source 210 provides grower data to PPP computing device 112 for use in generating pest pressure predictions. Grower data may include, for example, field boundary data, crop condition data, etc. Further, similar to scouting data source 208, in some embodiments, grower data source 210 is one of client systems 115. That is, a grower can both provide scouting data to PPP computing device 112 and view pest pressure prediction data and/or heat map data using the same computing device (e.g., a mobile computing device).

Other data source 212 may provide other types of data to PPP computing device 112 that are not available from data sources 202-210. For example, in some embodiments, other data source 212 includes a mapping database that provides mapping data (e.g., topographical maps of one or more geographic locations) to PPP computing device 112.

In the example embodiment, PPP computing device 112 receives data from at least one of data sources 202-212, and aggregates and analyzes that data (e.g., using machine learning) to generate pest pressure prediction data, as described herein. Further, PPP computing device 112 may also aggregate and analyze that data to generate heat map data, as described herein. The pest pressure prediction data and/or heat map data may be transmitted to client system 114 (e.g., for displaying to a user of client system 114).

In some embodiments, data from at least one of data sources 202-210 is automatically pushed to PPP computing device 112 (e.g., without PPP computing device 112 polling or querying data sources 202-210). Further, in some embodiments, PPP computing device 112 polls or queries (e.g., periodically or continuously) at least one of data sources 202-210 to retrieve the associated data.

Figure 3:
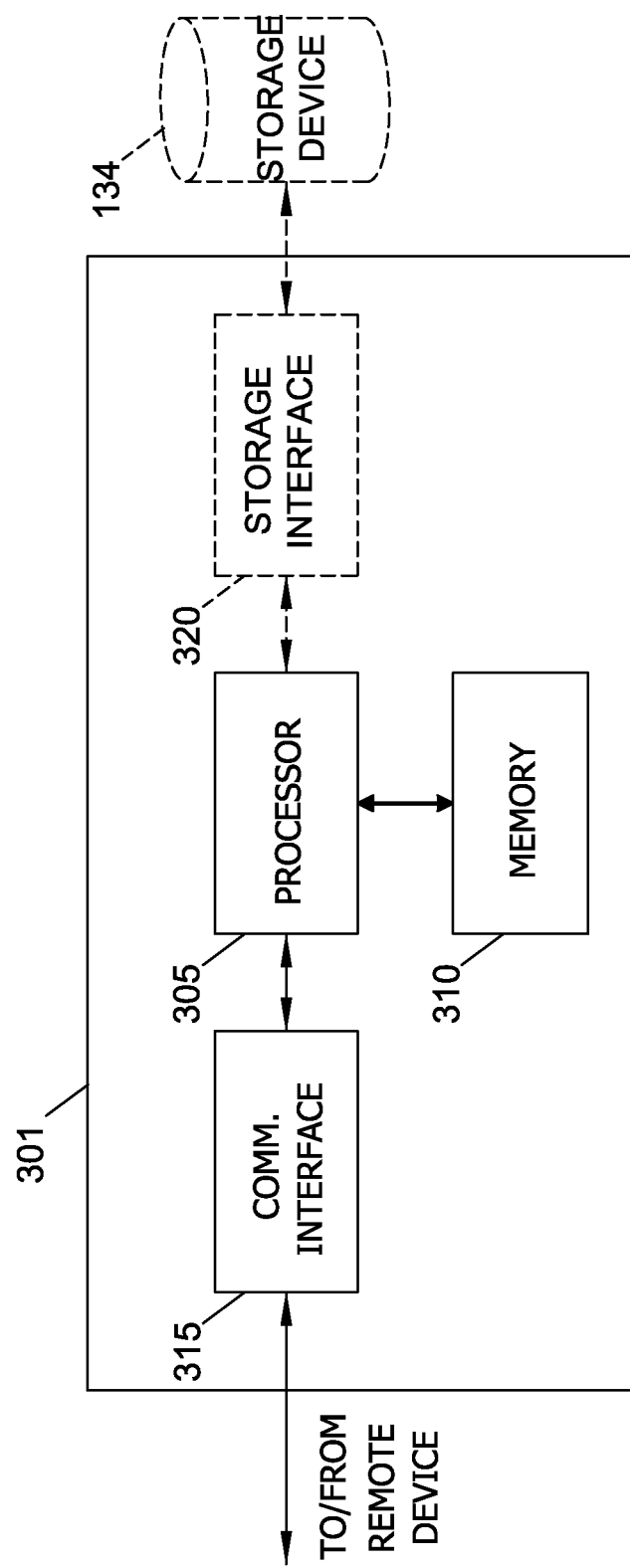

FIG. 3 illustrates an example configuration of a server system 301 such as PPP computing device 112 (shown in FIGS. 1 and 2), in accordance with one example embodiment of the present disclosure. Server system 301 may also include, but is not limited to, database server 116. In the example embodiment, server system 301 generates pest pressures prediction data and heat map data as described herein.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 4:
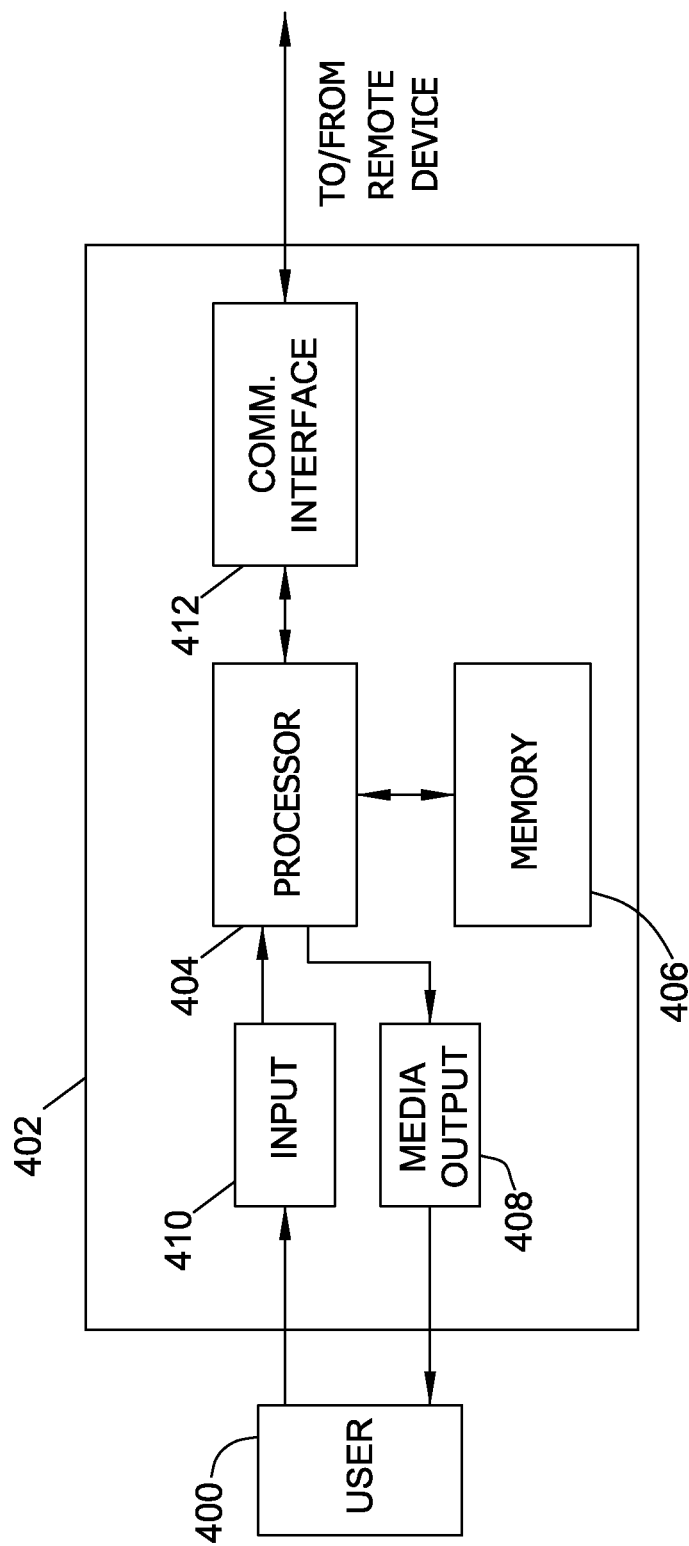

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400. Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 301 or a web server. Communication interface 412 may include, for example, a wired or wireless network adapter or a wireless data transceiver for use with a mobile phone network (e.g., Global System for Mobile communications (GSM), 3G, 4G, 5G, or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server. A client application allows users 400 to interact with a server application. The user interface, via one or both of a web browser and a client application, facilitates display of pest pressure information provided by PPP computing device 112. The client application may be capable of operating in both an online mode (in which the client application is in communication with PPP computing device 112) and an offline mode (in which the client application is not in communication with PPP computing device 112).

Figure 5:
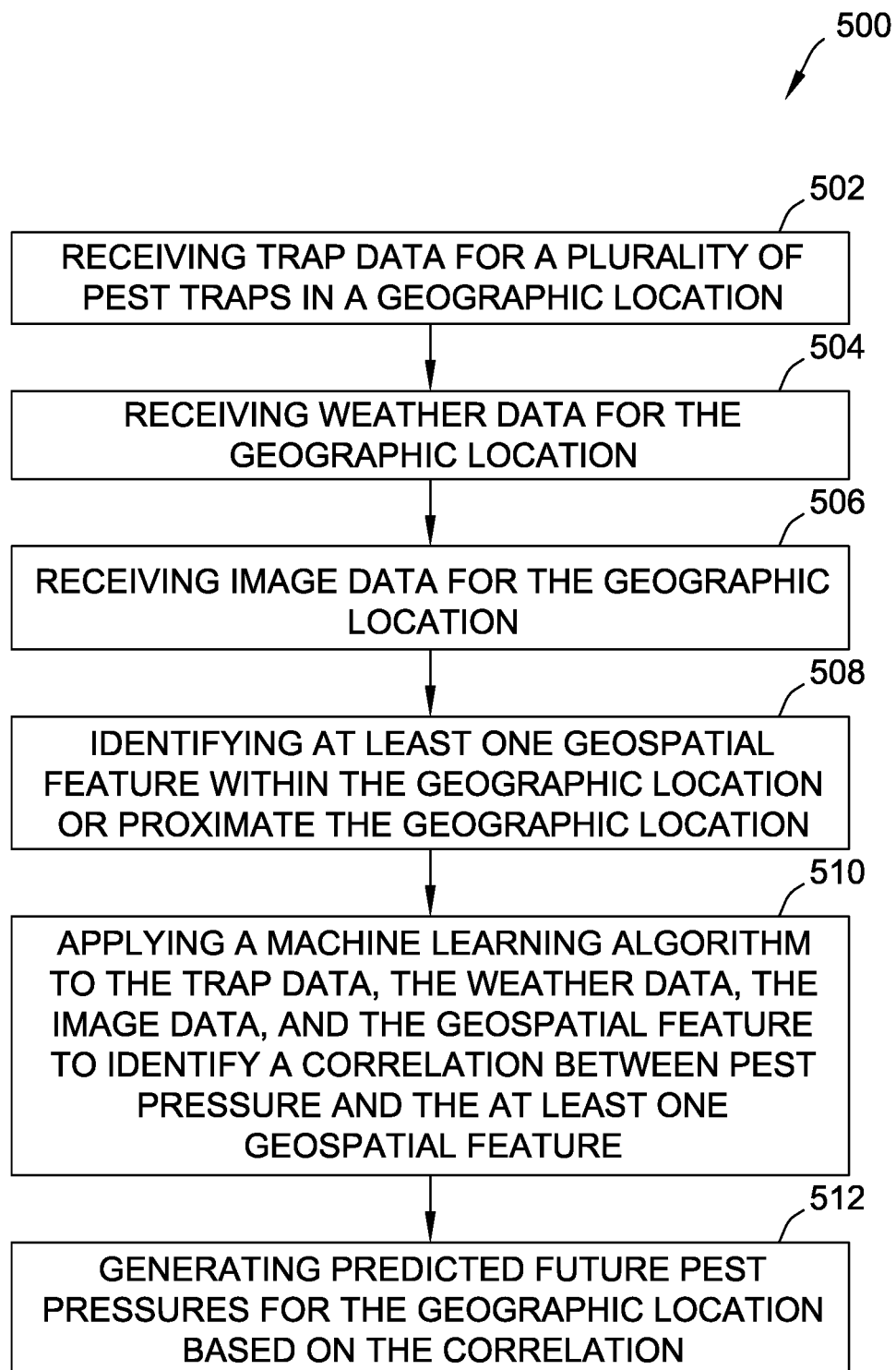

FIG. 5 is a flow diagram of an example method 500 for generating pest pressure data. Method 500 may be implemented, for example, using PPP computing device 112.

Method 500 includes receiving 502 trap data for a plurality of pest traps in a geographic location. In the example embodiment, the trap data includes both current pest pressure and historical pest pressure at each of the plurality of traps. The trap data may be received 502 from, for example, trap data source 206 (shown in FIG. 2). Further, PPP computing device 112 may analyze the received 502 trap data to generate additional data. For example, from the received 502 trap data, PPP computing device 112 may determine, for a number of different pest pressure levels (e.g., defined by suitable upper and lower thresholds), the number of traps at each level. Further, PPP computing device 112 may determine average pest pressures across a number of traps and/or across at least a portion of the geographic location. This additional data may be used in identifying correlations and predicting future pest pressures, as described herein.

Method 500 further includes receiving 504 weather data 502 for the geographic location. In the example embodiment, the weather data includes both current and historical weather conditions for the geographic location. Further, in some embodiments, the weather data may include predicted future weather conditions for the geographic location. The weather data may be received 504 from, for example, weather data source 202 (shown in FIG. 2).

In the example embodiment, method 500 further includes receiving 506 image data for the geographic location. The image data may include, for example, satellite and/or drone image data. The image data may be received 506 from, for example, imaging data source 204 (shown in FIG. 2).

Further, method 500 includes identifying 508 at least one geospatial feature within the geographic location or proximate the geographic location.

As used herein, a 'geospatial feature' refers to a geographic feature or structure that may have an impact on pest pressure. For example, a geographic feature may include a body of water (e.g., a river, a stream, a lake, etc.), an elevation feature (e.g., a mountain, a hill, a canyon, etc.), a transportation route (e.g., a road, a railroad track, etc.), a farm location, or a factory (e.g., a cotton factory).

In one embodiment, the at least geospatial feature is identified 508 from existing map data. For example, PPP computing device 112 may retrieve previously generated maps (e.g., topographical maps, elevation maps, road maps, surveys, etc.) from a map data source (such as other data source 212 (shown in FIG. 2)), the previously generated maps demarcating the one or more geospatial features.

In another embodiment, PPP computing device 112 identifies 508 the one or more geospatial features by analyzing the received 506 image data. For example, PPP computing device 112 may apply raster processing to the image data to generate a digital elevation map, where each pixel (or other similar subdivision) of the digital elevation map is associated with an elevation value. Then, based on the elevation values, PPP computing device 112 identifies 508 the one or more geospatial features from the digital elevation map. For example, elevation features and/or bodies of water may be identified using such techniques.

Method 500 further includes applying 510 a machine learning algorithm to the trap data, the weather data, the image data, and the at least one identified geospatial feature to identify a correlation between pest pressure and the at least one geospatial feature. Applying 510 the machine learning algorithm to the trap data, the weather data, the image data, and the at least one identified geospatial feature may be seen as applying 510 a machine learning-based scheme to the trap data, the weather data, the image data, and the at least one identified geospatial feature to identify a correlation between pest pressure and the at least one geospatial feature. In one or more example embodiments, applying 510 the machine learning algorithm to the trap data, the weather data, the image data, and the at least one identified geospatial feature may include determining a pest pressure value associated with a pest trap, based on a relation (e.g. a correlation) between pest pressure and the at least one geospatial feature.

In some embodiments, PPP computing device 112 may determine, by applying 510 the machine learning algorithm, that pest pressure (e.g., at the location of a pest trap) varies based on a distance from the at least one identified geospatial feature. For example, PPP computing device 112 may determine that pest pressure is higher at locations proximate to a body of water (e.g., due to increased pest levels at the body of water). In another example, PPP computing device 112 may determine that pest pressure is higher at locations proximate a transportation route (e.g., due to increased pest levels resulting from material transported along the transportation route). In yet another example, PPP computing device 112 may determine that pest pressure is higher at locations proximate a factory (e.g., due to increased pest levels resulting from materials processed at the factory). In yet other examples, PPP computing device 112 may determine that pest pressure is reduced at locations proximate the at least one identified geospatial feature.

Those of skill in the will appreciate that applying 510 the machine learning algorithm may identify other correlations between pest pressure at the at least one geospatial feature. Specifically, the machine learning algorithm considers the trap data, the weather data, the image data, and the at least one identified geospatial feature in combination, and is capable of detecting complex interactions between those different types of data that may not be ascertainable by a human analyst. For example, non-distance-based correlations between the at least one identified geospatial feature and pest pressure may be identified in some embodiments.

For example, in one or more example embodiments, applying 510 the machine learning algorithm to the trap data, the weather data, the image data, and the at least one identified geospatial feature may include determining a pest pressure value associated with a pest trap, based on a model (e.g. a machine learning model, a pest lifecycle model) characterizing a relation (e.g. a correlation) between pest pressure and the trap data (optionally wherein the trap data includes insect data, and/or developmental stage data of the insect). Further, in one or more example embodiments, applying 510 the machine learning algorithm to the trap data, the weather data, the image data, and the at least one identified geospatial feature may include determining a pest pressure value associated with a pest trap, based on a model (e.g. a machine learning model) characterizing a relation (e.g. a correlation) between pest pressure, the trap data, and the weather data.

Further, in some embodiments, pest pressure for a first pest may be correlated to pest pressure for a second, different pest, and that correlation may be detected using PPP computing device 112. For example, the at least one geospatial feature is a particular field having a known high pest pressure for the second pest. Using the systems and methods described herein, PPP computing device 112 may determine that locations proximate the particular field generally have a high pest pressure for the first pest, which correlates to the pest pressure level of the second pest in the particular field. These "inter-pest" correlations may be complex relationships that are identifiable by PPP computing device 112, but that would not be identifiable by a human analyst. Similarly, "inter-crop" correlations may be identified by PPP computing device 112 between nearby geographic locations that product different crops.

Subsequently, method 500 includes generating 512 predicted future pest pressures for the geographic location based on at least the identified correlation. Specifically, PPP computing device 112 uses the identified correlation, in combination with one or more models, algorithms, etc. to predict future pest pressure values for the geographic location. For example, PPP computing device 112 may utilize spray timer models, pest lifecycle models, etc. in combination with the identified correlation, trap data, weather data, and image data to generate 512 predicted future pest pressures based on identified patterns. Those of skill in the art will appreciate that other types of data may also be incorporated to generated 512 predicted future pest pressures. For example, previously planted crop data, neighboring farm data, field water level data, and/or soil type data may be considered when predicting future pest pressures.

As one example of a model, developmental stages of a pest of interest (e.g., an insect, or a fungus) may be governed by an ambient temperature. Accordingly, using a "degree day" model, developmental stages of the pest may be predicted based on heat accumulation (e.g., determined from temperature data).

The generated 512 predicted future pest pressures are one example of pest pressure prediction data that may be transmitted to and displayed on a user computing device, such as client system 114 (shown in FIGS. 1 and 2). For example, the predicted future pest pressures may be transmitted to the user computing device to cause the user computing device to present the predicted future pest pressures in a textual, graphical, and/or audio format, or any other suitable format. As described below in detail, in some embodiments, one or more heat maps illustrating predicted future pest pressures are displayed on the user computing device.

From the generated 512 predicted future pest pressures, in some embodiments, the systems and methods described herein may also be used to generate (e.g., using machine learning) a treatment recommendation for the geographic location to address the predicted future pest pressures. For example, with an accurate prediction of future pest pressures in place, PPP computing device 112 may automatically generate a treatment plan for the geographic location to mitigate future levels of high pest pressure. The treatment plan may specify, for example, one or more substances (e.g., pesticides, fertilizers, etc.) and specific times when those one or more substances should be applied (e.g., daily, weekly etc.). Alternatively, the treatment plan may include other data to facilitate improving agricultural performance in view of predicted future pest pressures.

Further, in some embodiments, the generated 512 predicted future pest pressures are used (e.g., by PPP computing device 112) to control additional systems. In one embodiment, a system for monitoring pest pressure (e.g., a system including pest traps) may be controlled based on the predicted future pest pressures. For example, a reporting frequency and/or type of trap data reported by one or more pest traps may be modified based on the predicted future pest pressures. In another example, spraying equipment (e.g., for spraying pesticides) or other agricultural equipment may be controlled based on the predicted future pest pressures.

As noted above, PPP computing device 112 may also generate one or more heat maps using pest pressure prediction data. For the purposes of this discussion, PPP computing device 112 may be referred to herein as heat map generation computing device 112.

Figure 6:
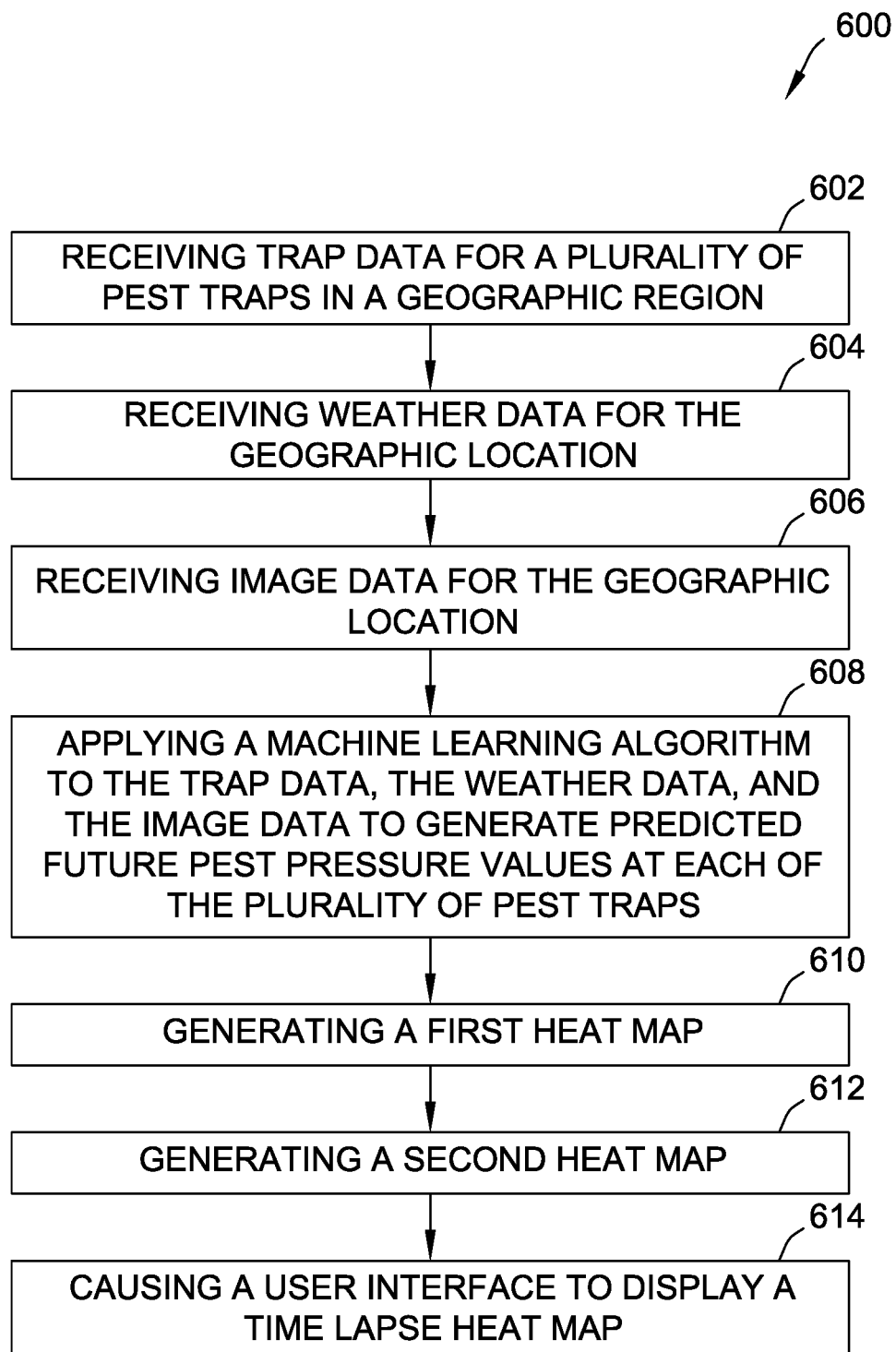

FIG. 6 is a flow diagram of an example method 600 for generating heat maps. Method 600 may be implemented, for example, using heat map generation computing device 112 (shown in FIG. 1).

Method 600 includes receiving 602 trap data for a plurality of pest traps in a geographic region. In the example embodiment, the trap data includes both current pest pressure and historical pest pressure at each of the plurality of traps. The trap data may be received 602 from, for example, trap data source 206 (shown in FIG. 2).

Further, method 600 includes receiving 604 weather data for the geographic location. In the example embodiment, the weather data includes both current and historical weather conditions for the geographic location. Further, in some embodiments, the weather data may include predicted future weather conditions for the geographic location. The weather data may be received 604 from, for example, weather data source 202 (shown in FIG. 2).

In the example embodiment, method 600 further includes receiving 606 image data for the geographic location. The image data may include, for example, satellite and/or drone image data. The image data may be received 606 from, for example, imaging data source 204 (shown in FIG. 2).

Method 600 further includes applying 608 a machine learning algorithm to the trap data, the weather data, and the image data to generate predicted future pest pressure values at each of the plurality of pest traps.

In addition, method 600 includes generating 610 a first heat map and generating 612 a second heat map. In the example embodiment, the first heat map is associated with a first point in time and the second heat map is associated with a difference, second point in time. The first and second heat maps may be generated 610, 612 as follows.

Figure 7:
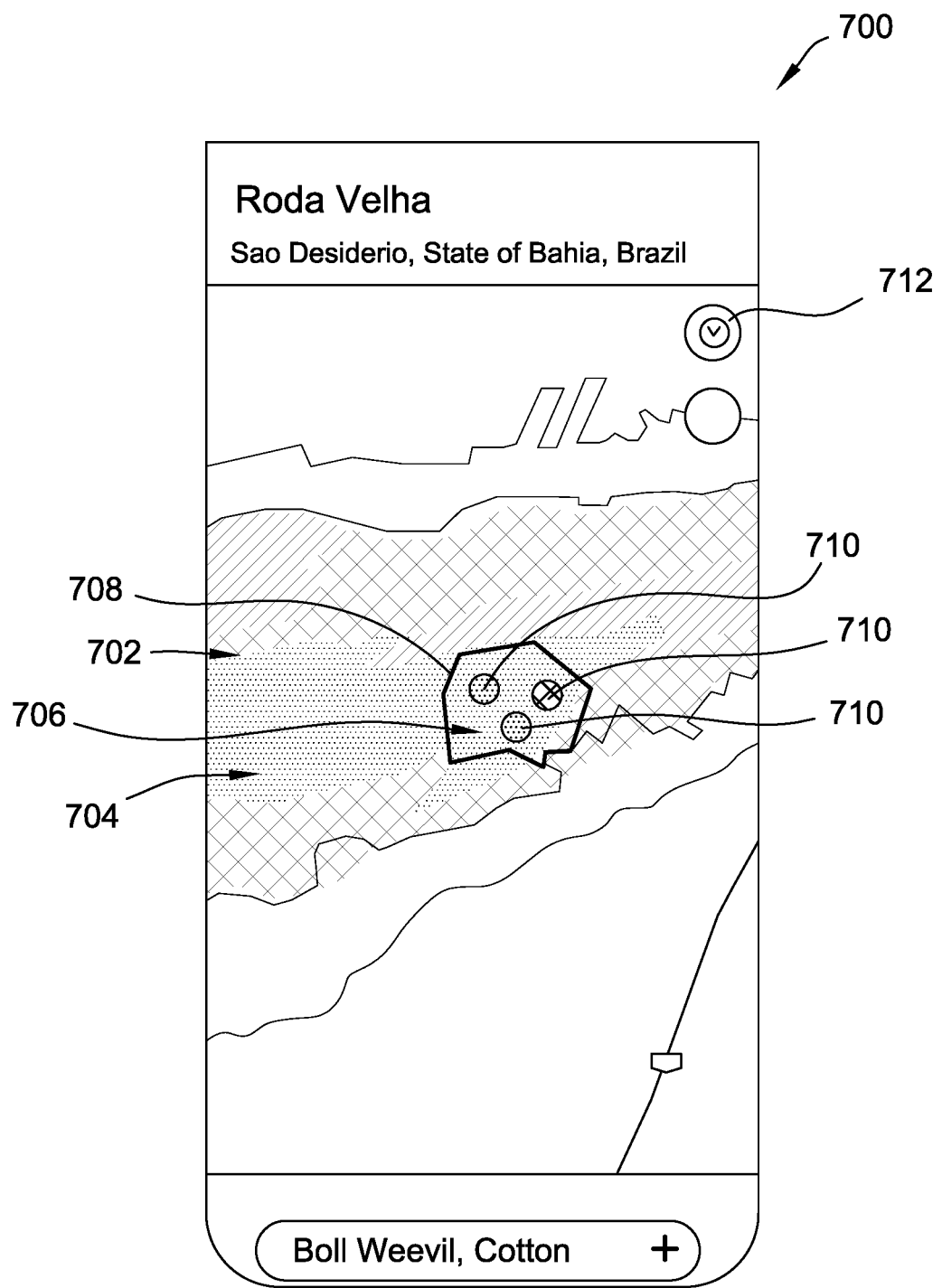
Figure 8:
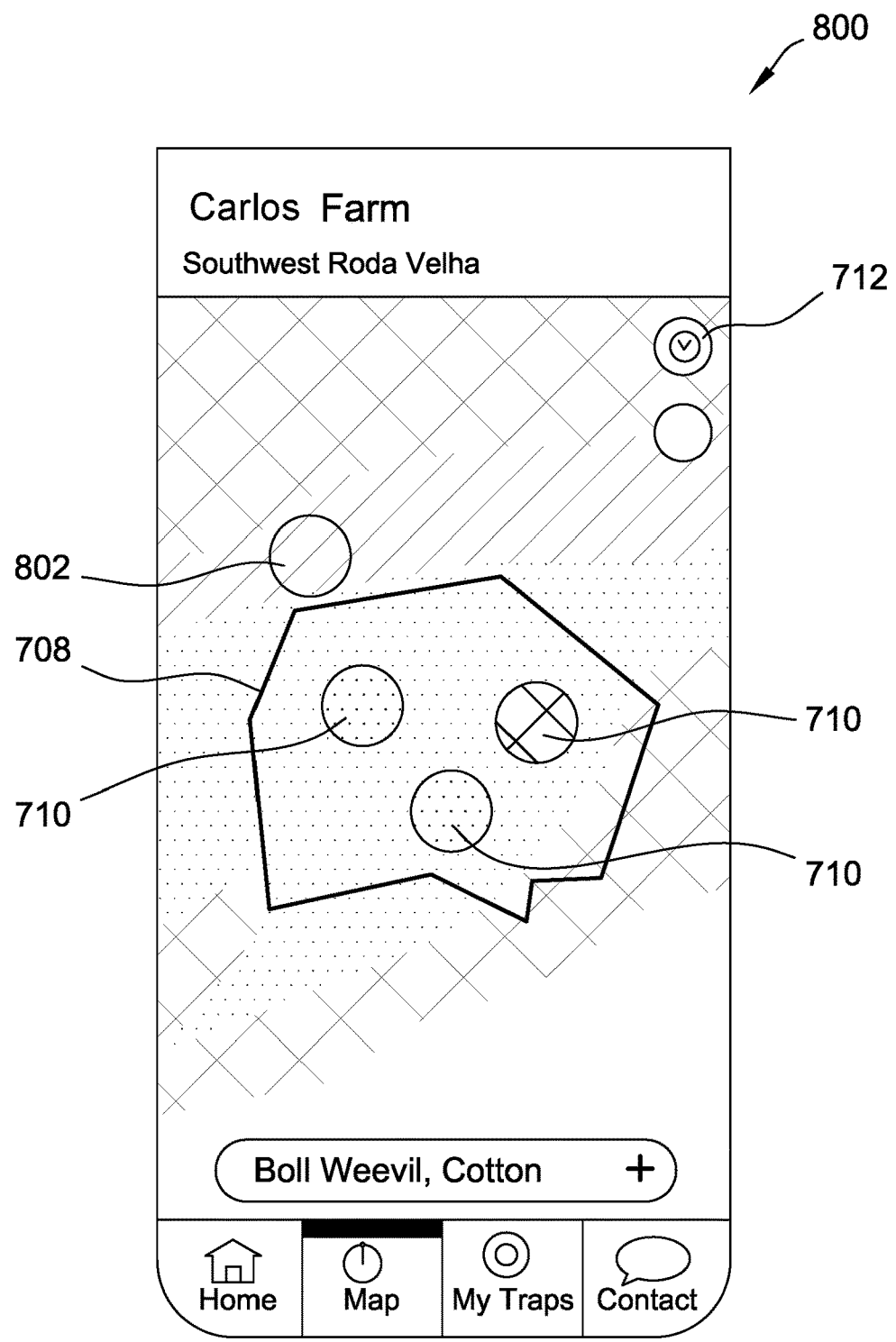
Figure 9:
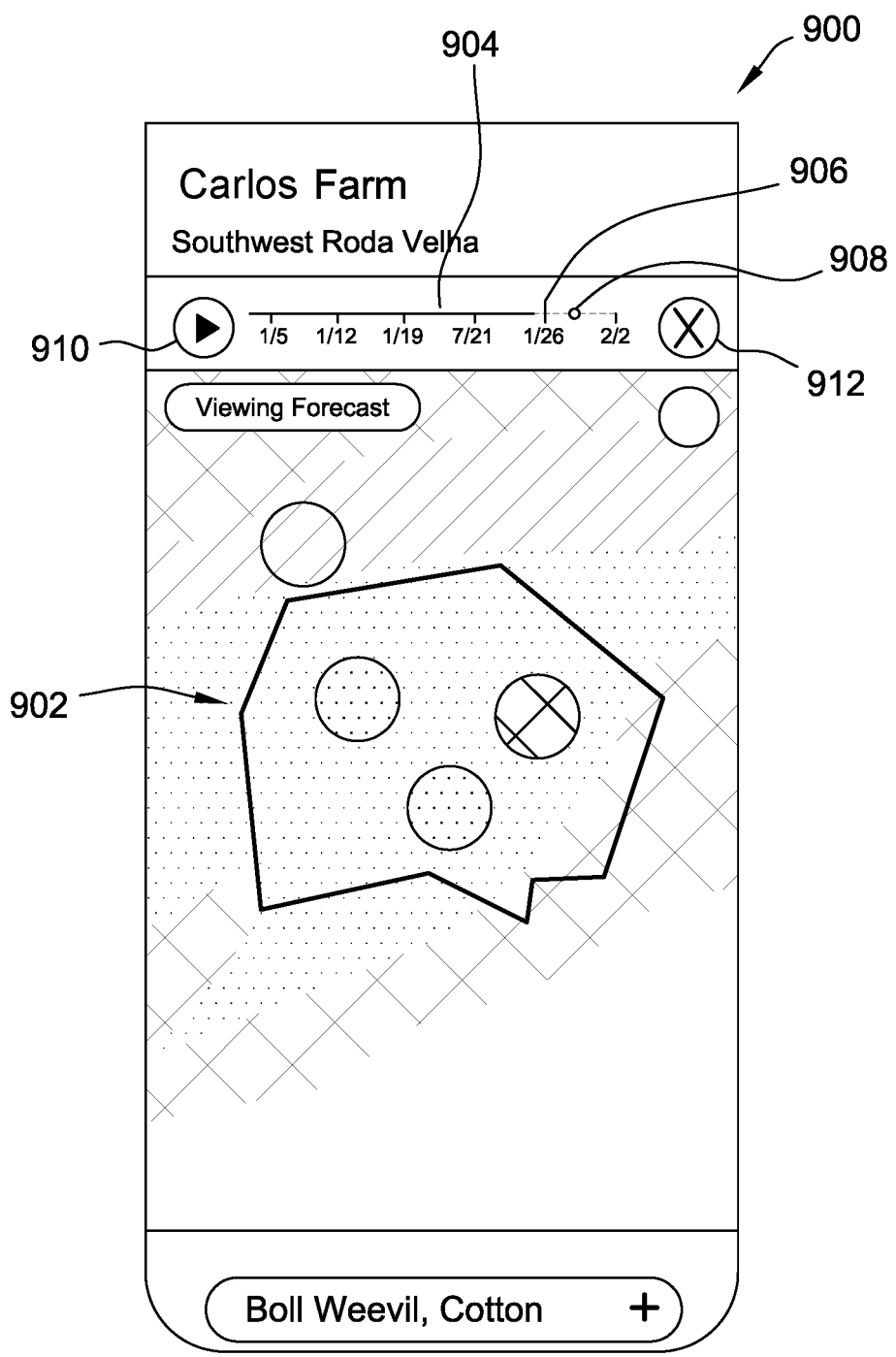

In the example embodiment, each heat map is generated by plotting a plurality of nodes on a map of the geographic location. Each node corresponds to the location of particular pest trap of the plurality of pest traps. Further, in the example embodiment, each node is displayed in a color that represents the pest pressure value for the corresponding test trap at the associated point in time. In one example, each node is displayed green (indicating a low pest pressure value), yellow (indicating a moderate pest pressure value), or red (indicating a high pest pressure value). In FIGS. 7-9, green is indicated by a diagonal line pattern, yellow is indicated by a cross hatch pattern, and red is indicated by a dot pattern. Those of skill in the art will appreciate that other numbers of colors and different colors may be used in the embodiments described herein. Depending on the point in time associated with the heat map, the color of the node may indicate a past pest pressure value (if the point in time is in the past), a current pest pressure value (if the point in time is the present), or a predicted future pest pressure value (if the point in time is in the future). The future predicted pest pressure values may be generated, for example, using machine learning algorithms, as described herein.

To complete the heat map, at least some of the remaining portions of the map including the colored nodes are colored. Specifically, remaining portions of the map are colored to generate a continuous map of pest pressure values. In the example embodiment, the remaining portions are colored by interpolating between the pest pressure values at the plurality of nodes.

In one embodiment, interpolation is performed using an inverse distance weighting (IDW) algorithm, wherein points on remaining portions of the map are colored based on their distance from known pest pressure values at the nodes. For example, in such an embodiment, pest pressure values for locations without nodes may be calculated based on a weighted average of inverse distances nearby nodes. This embodiment operates under the assumption that pest pressure at a particular point will be more strongly influenced by nodes that are closer (as opposed to more distant nodes). In other embodiments, interpolation may be performed based on other criteria in addition to, or alternative to distance from the nodes.

With pest pressure values generated for at least some of the remaining portions of the map (using interpolation, as described above), those portions are colored based on the generated pest pressure values. As with the nodes, in one example, green indicates a low pest pressure value, yellow indicates a moderate pest pressure value, and red indicates a high pest pressure value. The thresholds for the different colors may be set, for example, based on historical pest pressure, and may be adjusted over time (automatically or based on user input). Those of skill in the art will appreciate that these three colors are only examples, and that any suitable coloring scheme may be used to generate the heat maps described herein.

In the example embodiment, the first and second heat maps are stored in a database, such as database 120 (shown in FIG. 1). Accordingly, in this embodiment, when a user views heat maps on a user device (e.g., a mobile computing device), as described below, the heat maps have already been previously generated and stored by heat map generation computing device 112. Alternatively, heat maps may be generated and displayed in real-time based on the user's request.

With the first and second heat maps generated 610, 612, in the example embodiment, method 600 further includes causing 614 a user interface to display a time lapse heat map. The user interface may be, for example, a user interface displayed on client device 114 (shown in FIGS. 1 and 2). The user interface may be implemented, for example, via an application installed on the client device 114 (e.g., an application provided by the entity that operates heat generation computing device 112).

The time lapse heat map displays an animation on the user interface. Specifically, in the example embodiment, the time lapse heat map dynamically transitions between a plurality of previously generated heat maps (e.g., the first and second heat maps) over time, as described below. Accordingly, by viewing the dynamic heat map, users can easily see and appreciate changes in pest pressure over time for the geographic region. The time lapse heat map may display past, current, and/or future pest pressure values for the geographic region.

It should be understood that, in example embodiment, the second heat map for a second point in time is generated using predicted pest pressure values, and this second point in time refers to a point in time later than the time of the most recent current and historical pest pressure values (e.g., included in the trap data) incorporated into the machine learning algorithm. That is, the second point in time refers to a future point in time in such embodiments.

With respect to the first heat map for a first point in time, in the example embodiment, this is generated using pest pressure values for a point in time earlier than the second point in time. Accordingly, the pest pressure values used for generating the first heat map are generally either current or historical pest pressure values. In another embodiment, the first point in time is also a future point in time, but a different point in time than the second point in time. Thus, the pest pressure values used for generating the first heat map are predicted pest pressure values as well.

Within the scope of this disclosure, it should be understood that reference made herein to "a first heat map" and "a second heat map" and to "the first and second heat maps" can imply that one or more (e.g., a plurality of) "intermediate heat maps" are generated using pest pressure values (e.g. current, historical or predicted pest pressure values, as the case may be) for various points in time between the first point in time and the second point in time. In such cases, the time lapse heat map displays a dynamic transition between the first heat map, the one or more intermediate heat maps, and the second heat map over time. In one embodiment, the intermediate heat maps include one or more (e.g., a plurality of) intermediate heat maps generated using predicted pest pressure values. In another embodiment, the intermediate heat maps include one or more (e.g., a plurality of) intermediate heat maps generated using current and/or historical pest pressure values. In yet another embodiment, the intermediate heat maps include one or more (e.g., a plurality of) intermediate heat maps generated using predicted pest pressure values and one or more (e.g., a plurality of) intermediate heat maps generated using current and/or historical pest pressure values.

In one embodiment, to display the time lapse heat map, each previously generated heat map is displayed for a brief period of time before instantaneously transitioning to the next heat map (e.g., in a slideshow format). Alternatively, in some embodiments, heat map generation computing device 112 temporally interpolates between consecutive heat maps to generate transition data (e.g., using machine learning) between those heat maps. In such embodiments, the time lapse heat map displays a smooth evolution of pest pressure over time, instead of a series of static images.

FIG. 7 is a first screenshot 700 of a user interface that may be displayed on a computing device, such as client system 114 (shown in FIGS. 1 and 2). The computing device may be, for example, a mobile computing device.

First screenshot 700 includes a pest pressure heat map 702 that displays pest pressure associated with a particular pest and crop in a region 704 including a field 706. In the example shown in first screenshot 700, the pest is boll weevil and the crop is cotton. Those of skill in the art will appreciate that the heat maps described herein may display pest pressure information for any suitable pest and crop. Further, in some embodiments, heat maps may display pest pressures for multiple pests in the same crop, one pest in multiple crops, or multiple pests in multiple crops.

As shown in FIG. 7, field 706 is demarcated on heat map 702 by a field boundary 708. Field boundary 708 may be plotted on heat map 702 by heat map generation computing device 112 based on, for example, information provided by a grower associated with field 706. For example, the grower may provide information to heat map generation computing device 112 from a grower computing device, such as grower data source 210 (shown in FIG. 2).

Heat map 702 includes three nodes 710, corresponding to three pest traps in field 706. As shown in FIG. 7, each node 710 has an associated color (here two red nodes and one yellow node). Further, in heat map 702, locations not including nodes 710 are colored by interpolating the pest pressure values at nodes 710, generating a continuous map of pest pressure values. Although only three nodes 710 are shown in FIG. 7, those of skill in the art will appreciate that the additional pest traps may be used to color portions of heat map 702. In this example, heat map 702 is a static heat map that shows pest pressure at a particular point in time (e.g., one of the first and second heat maps described above).

First screenshot 700 further includes a time lapse button 712 that, when selected by a user, causes a time lapse heat map to be displayed, as described herein.

FIG. 8 is a second screenshot 800 of the user interface that may be displayed on a computing device, such as client system 114 (shown in FIGS. 1 and 2). Specifically, second screenshot 800 shows an enlarged view of heat map 702. The enlarged view may be generated, for example, in response to the user making a selection on the user interface to change a zoom level.

As shown in FIG. 8, additional information not shown in first screenshot 700 is shown in the enlarged view. For example, an additional node 802 (representing an additional trap) is now visible. Further, an associated trap name is displayed with each node 710. In the exemplary embodiment, in the enlarged view, the user can select a particular node 710 to cause the user interface to display pest pressure data for that node 710. This is described in further detail below in association with FIG. 10.

FIG. 9 is a third screenshot 900 of the user interface that may be displayed on a computing device, such as client system 114 (shown in FIGS. 1 and 2). Specifically, third screenshot 900 shows a time lapse heat map 902. Time lapse heat map 902 may be displayed, for example, in response to the user selecting time lapse button 712 (shown in FIGS. 7 and 8).

As shown in FIG. 9, a timeline 904 is displayed in association with time lapse heat map 902. Timeline 904 enables a user to quickly determine which time pest pressure is currently being shown for. Timeline 904 shows a range of dates, including historical and future dates in the example embodiment. Further, timeline 904 includes a current time marker 906 indicating the current (i.e., present time), as well as a selected time marker 908 that indicates what time is associated with the pest pressure shown on time lapse heat map 902.

For example, in FIG. 9, timeline 904 extends from January 5 to February 2, the current day is January 26, and time lapse heat map 902 shows pest pressures for January 29. Notably, the pest pressure shown in FIG. 9 is a predicted future pest pressure, as selected time marker 908 is later than current time marker 906.

In one embodiment, a user can adjust selected time marker 908 (e.g., by selecting and dragging selected time marker 908) to manipulate what time is displayed by time lapse heat map 902. Further, in the example embodiment, when the user selects an activation icon 910, time lapse heat map 902 is displayed as an animation, automatically transitioning between different static heat maps to show the evolution of pest pressure over time. A stop icon 912 is also shown in screenshot 900. When the user has previously selected activation icon 910, the user can select the stop icon 912 to stop the animation and freeze time lapse heat map 902 at a desired point in time.

Figure 10:
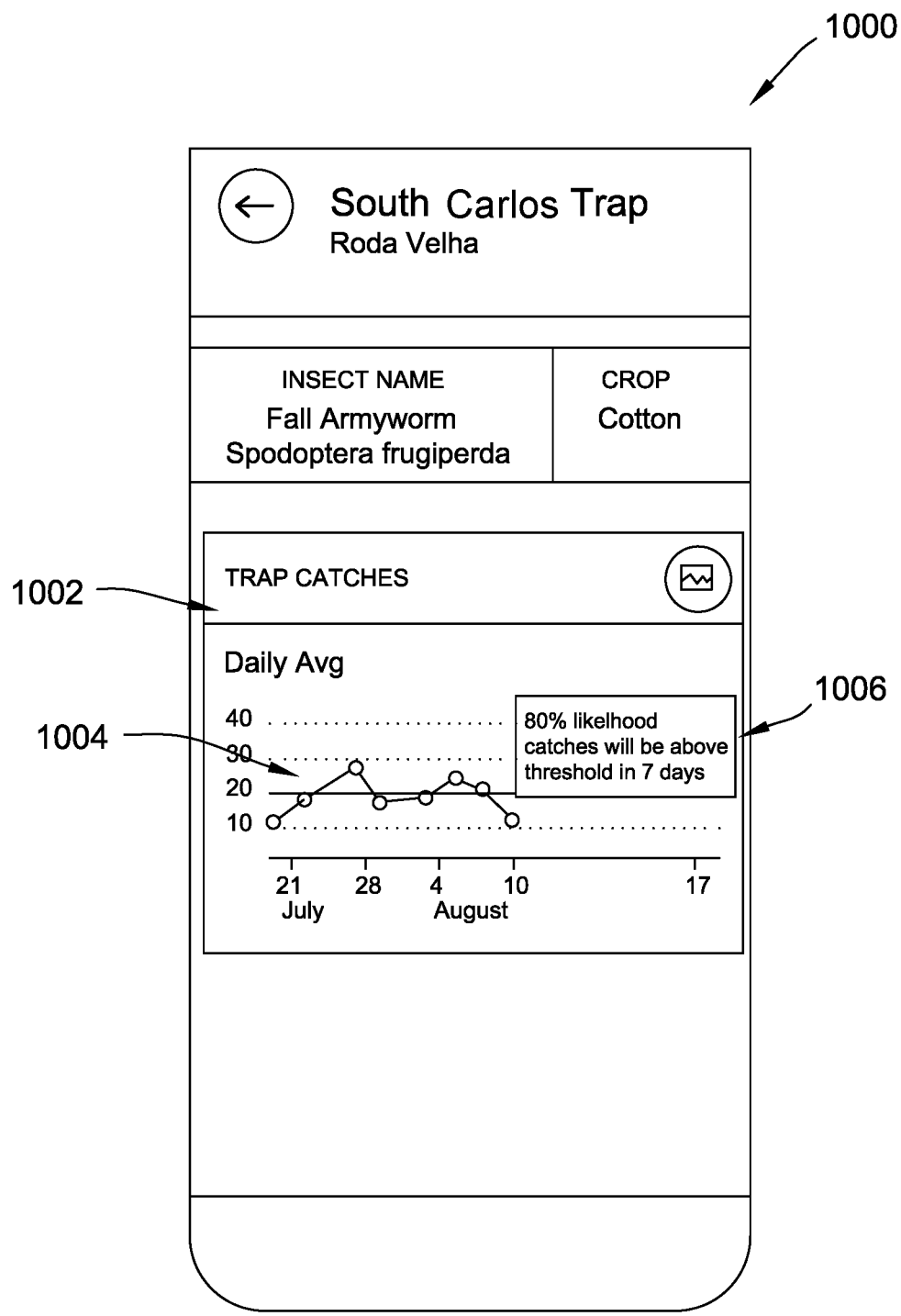

FIG. 10 is a fourth screenshot 1000 of the user interface that may be displayed on a computing device, such as client system 114 (shown in FIGS. 1 and 2). Specifically, fourth screenshot 1000 shows pest pressure data 1002 for a particular trap. Pest pressure data 1002 may be displayed, for example, in response to the user selecting a particular node 710 (as described above in reference to FIG. 8). In one embodiment, pest pressure data 1002 includes graphical data 1004 that displays pest pressure over time (e.g., current and historical pest pressure) and textual data 1006 that summarizes predicted future pest pressure.

Further, in some embodiments, the generated heat maps facilitate controlling additional systems. In one embodiment, a system for monitoring pest pressure (e.g., a system including pest traps) may be controlled based on the heat maps. For example, a reporting frequency and/or type of trap data reported by one or more pest traps may be modified based on the heat maps. In another example, spraying equipment (e.g., for spraying pesticides) or other agricultural equipment may be controlled based on the heat maps.

At least one of the technical problems addressed by this system includes: i) inability to accurately monitor pest pressure; ii) inability to accurately predict future pest pressure; and iii) inability to communicate pest pressure information to a user in a comprehensive, straightforward manner.

The technical effects provided by the embodiments described herein include at least i) monitoring pest pressure in real-time; ii) accurately predicting future pest pressure using machine learning; iii) controlling other systems or equipment based on predicted future pest pressures; iv) generating comprehensive heat maps illustrating pest pressure; v) generating time lapse heat maps that dynamically display changes in pest pressure over time; and vi) controlling other systems or equipment based on generated heat maps.

Further, a technical effect of the systems and processes described herein is achieved by performing at least one of the following steps: (i) receiving trap data for a plurality of pest traps in a geographic location, the trap data including current and historical pest pressure values at each of the plurality of pest traps; (ii) receiving weather data for the geographic location; (iii) receiving image data for the geographic location; (iv) applying a machine learning algorithm to the trap data, the weather data, and the image data to generate predicted future pest pressure values at each of the plurality of pest traps; (v) generating a first heat map for a first point in time and a second heat map for a second point in time, the second heat map generated using the predicted future pest pressure values, the first and second heat maps each generated by a) plotting a plurality of nodes on a map of the geographic location, each node corresponding to one of the plurality of pest traps, each node having a color that represents the pest pressure value for the corresponding pest trap at the associated point in time, and b) coloring at least some remaining portions of the map of the geographic location to generate a continuous map of pest pressure values for the geographic location by interpolating between pest pressure values associated with the plurality of nodes at the associated point in time; and (vi) transmitting the first and second heat maps to a mobile computing device to cause a user interface on the mobile computing device to display a time lapse heat map that dynamically transitions between the first heat map and the second heat map over time, the user interface implemented via an application installed on the mobile computing device.

A processor or a processing element in the embodiments described herein may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to analyzing trap data, weather data, image data, geospatial (e.g., using one or more models) to predict future pest pressure.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat map generation computing device comprising:
   a memory; and
   a processor communicatively coupled to the memory, the processor programmed to:
      receive trap data for a plurality of pest traps in a geographic location, the trap data including current and historical pest pressure values at each of the plurality of pest traps;
      receive weather data for the geographic location;
      receive image data for the geographic location;
      apply a machine learning algorithm to the trap data, the weather data, and the image data to generate predicted future pest pressure values at each of the plurality of pest traps;
      generate a first heat map for a first point in time and a second heat map for a second point in time, the second heat map generated using the predicted future pest pressure values, the first and second heat maps each generated by:
         plotting a plurality of nodes on a map of the geographic location, each node corresponding to one of the plurality of pest traps, each node having a color that represents the pest pressure value for the corresponding pest trap at the associated point in time; and
         coloring at least some remaining portions of the map of the geographic location to generate a continuous map of pest pressure values for the geographic location by interpolating between pest pressure values associated with the plurality of nodes at the associated point in time; and
      transmit the first and second heat maps to a mobile computing device to cause a user interface on the mobile computing device to display a time lapse heat map that dynamically transitions between the first heat map and the second heat map over time, the user interface implemented via an application installed on the mobile computing device.

2. The heat map generation computing device of claim 1, wherein at least one of the first point in time and the second point in time is a future point in time.

3. The heat map generation computing device as in any of claims 1-2, wherein the processor is further programmed to:
   generate a treatment recommendation for the geographic location based on the predicted future pest pressure values.

4. The heat map generation computing device as in any of claims 1-3, wherein the processor is further programmed to:
   receive, from the mobile computing device, a user selection of a selected node in the heat map, the user selection made using the user interface; and
   cause the user interface to display, in response to the received user selection, pest pressure values for the selected node plotted over time.

5. The heat map generation computing device as in any of claims 1-4, wherein the processor is programmed to color at least some remaining portions of the map by interpolating based on distances from nearby pest traps of the plurality of pest traps.

6. The heat map generation computing device as in any of claims 1-5, wherein to generate the first and second heat maps, the processor is further programmed to plot a farm boundary on the map of the geographic location.

7. The heat map generation computing device as in any of claims 1-6, wherein the first and second heat maps are associated with a first pest, and wherein the processor is further programmed to:
   generate a third heat map associated with a second pest;
   receive a user selection of the second pest made using the user interface; and
   cause the user interface to display, in response to the received user selection, the third heat map.

8. A method for generating heat maps, the method implemented using a heat map generation computing device including a memory communicatively coupled to a processor, the method comprising:
   receiving trap data for a plurality of pest traps in a geographic location, the trap data including current and historical pest pressure values at each of the plurality of pest traps;
   receiving weather data for the geographic location;
   receiving image data for the geographic location;
   applying a machine learning algorithm to the trap data, the weather data, and the image data to generate predicted future pest pressure values at each of the plurality of pest traps;
   generating a first heat map for a first point in time and a second heat map for a second point in time, the second heat map generated using the predicted future pest pressure values, the first and second heat maps each generated by:
      plotting a plurality of nodes on a map of the geographic location, each node corresponding to one of the plurality of pest traps, each node having a color that represents the pest pressure value for the corresponding pest trap at the associated point in time; and coloring at least some remaining portions of the map of the geographic location to generate a continuous map of pest pressure values for the geographic location by interpolating between pest pressure values associated with the plurality of nodes at the associated point in time; and transmitting the first and second heat maps to a mobile computing device to cause a user interface on the mobile computing device to display a time lapse heat map that dynamically transitions between the first heat map and the second heat map over time, the user interface implemented via an application installed on the mobile computing device.

9. The method of claim 8, wherein at least one of the first point in time and the second point in time is a future point in time.

10. The method as in any of claims 8-9, further comprising:

generating a treatment recommendation for the geographic location based on the predicted future pest pressure values.

11. The method as in any of claims 8-10, further comprising:

receiving, from the mobile computing device, a user selection of a selected node in the heat map, the user selection made using the user interface; and causing the user interface to display, in response to the received user selection, pest pressure values for the selected node plotted over time.

12. The method as in any of claims 8-11, wherein coloring at least some remaining portions of the map comprises coloring by interpolating based on distances from nearby pest traps of the plurality of pest traps.

13. The method as in any of claims 8-12, wherein generating the first and second heat maps further comprises plotting a farm boundary on the map of the geographic location.

14. The method as in any of claims 8-13, wherein the first and second heat maps are associated with a first pest, and wherein the method further comprises:

generating a third heat map associated with a second pest;
receiving a user selection of the second pest made using the user interface; and
causing the user interface to display, in response to the received user selection, the third heat map.

15. A computer-readable storage medium having computer-executable instructions embodied thereon, wherein when executed by a heat map generation computing device including at least one processor in communication with a memory, the computer-readable instructions cause the heat map generation computing device to:

receive trap data for a plurality of pest traps in a geographic location, the trap data including current and historical pest pressure values at each of the plurality of pest traps;

receive weather data for the geographic location;
receive image data for the geographic location;
apply a machine learning algorithm to the trap data, the weather data, and the image data to generate predicted future pest pressure values at each of the plurality of pest traps;

generate a first heat map for a first point in time and a second heat map for a second point in time, the second heat map generated using the predicted future pest pressure values, the first and second heat maps each generated by:

plotting a plurality of nodes on a map of the geographic location, each node corresponding to one of the plurality of pest traps, each node having a color that represents the pest pressure value for the corresponding pest trap at the associated point in time; and coloring at least some remaining portions of the map of the geographic location to generate a continuous map of pest pressure values for the geographic location by interpolating between pest pressure values associated with the plurality of nodes at the associated point in time; and transmit the first and second heat maps to a mobile computing device to cause a user interface on the mobile computing device to display a time lapse heat map that dynamically transitions between the first heat map and the second heat map over time, the user interface implemented via an application installed on the mobile computing device.

16. The computer-readable storage medium of claim 15, wherein at least one of the first point in time and the second point in time is a future point in time.

17. The computer-readable storage medium as in any of claims 15-16, wherein the instructions further cause the heat map generation computing device to:

generate a treatment recommendation for the geographic location based on the predicted future pest pressure values.

18. The computer-readable storage medium as in any of claims 15-17, wherein the instructions further cause the heat map generation computing device to:

receive, from the mobile computing device, a user selection of a selected node in the heat map, the user selection made using the user interface; and cause the user interface to display, in response to the received user selection, pest pressure values for the selected node plotted over time.

19. The computer-readable storage medium as in any of claims 15-18, wherein to color at least some remaining portions of the map, the instructions cause the heat map generation computing device to interpolate based on distances from nearby pest traps of the plurality of pest traps.

20. The computer-readable storage medium as in any of claims 15-19, wherein to generate the first and second heat maps, the instructions cause the heat map generation computing device to plot a farm boundary on the map of the geographic location.

* * * * *